US012670329B2

(12) United States Patent
Hong et al.

(10) Patent No.: US 12,670,329 B2
(45) Date of Patent: Jun. 30, 2026

(54) METHOD, APPARATUS, DEVICE, AND STORAGE MEDIUM FOR CLUSTERING EXTRACTION OF ENTITY RELATIONSHIPS

(71) Applicant: Beijing Hydrophis Network Technology Co., Ltd., Beijing (CN)

(72) Inventors: Feng Hong, Beijing (CN); Min Huang, Beijing (CN); Weijie Zhou, Beijing (CN); Shanliang Xiong, Beijing (CN); Wenbi Cai, Beijing (CN); Youpeng Wei, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 202 days.

(21) Appl. No.: 18/599,315

(22) Filed: Mar. 8, 2024

(65) Prior Publication Data

US 2024/0311931 A1      Sep. 19, 2024

(30) Foreign Application Priority Data

Mar. 16, 2023      (CN) .......................... 202310271936.7

(51) Int. Cl.
G06F 40/30          (2020.01)
G06Q 10/40          (2026.01)
(52) U.S. Cl.
CPC ............. G06Q 10/40 (2026.01); G06F 40/30 (2020.01)
(58) Field of Classification Search
CPC ...................................................... G06N 3/08
See application file for complete search history.

(56) References Cited

U.S. PATENT DOCUMENTS

2020/0409936 A1* 12/2020 Salkola ................... G06F 3/011

OTHER PUBLICATIONS

CN_103365912, Miu, Qing-liang, Oct. 23, 2013 (Year: 2013).*
Franko, Yullia, et al. "Method and Software for Solving the Problem of Fuzzy Matching of Records in Relative Databases." 2021 11th International Conference on Advanced Computer Information Technologies (ACIT). IEEE, 2021. (Year: 2021).*

(Continued)

*Primary Examiner* — Paras D Shah
*Assistant Examiner* — Ali M Hassan

(57) ABSTRACT

The present disclosure relates to an artificial intelligence technology, and discloses a method, an apparatus, a device, and a storage medium for clustering extraction of entity relationships. The method includes: capturing social relationship data of a user, performing entity recognition operation on the social relationship data to obtain an entity recognition result, and performing reverse marking operation on the social relationship data according to the entity recognition result to obtain a data marking sequence set; performing entity relationship recognition on various data marking sequences in the data marking sequence set to obtain a relationship recognition result, and constructing to obtain an entity-relationship group set; and calculating a character similarity between various entities and a semantic similarity between various entity relationships in the entity-relationship group set, and clustering various entity-relationship groups in the entity-relationship group set. The present disclosure may improve the extraction efficiency of entity relationships.

14 Claims, 6 Drawing Sheets

(56) References Cited

OTHER PUBLICATIONS

Xie, Zhiwen, et al. "Topic enhanced deep structured semantic models for knowledge base question answering." Science China Information Sciences 60.11 (2017): 110103. (Year: 2016).*
Yong, Zhou, Lishi Youwen, and Xia Shixiong. "An improved KNN text classification algorithm based on clustering." Journal of computers 4.3 (2009): 230-237. (Year: 2009).*

* cited by examiner

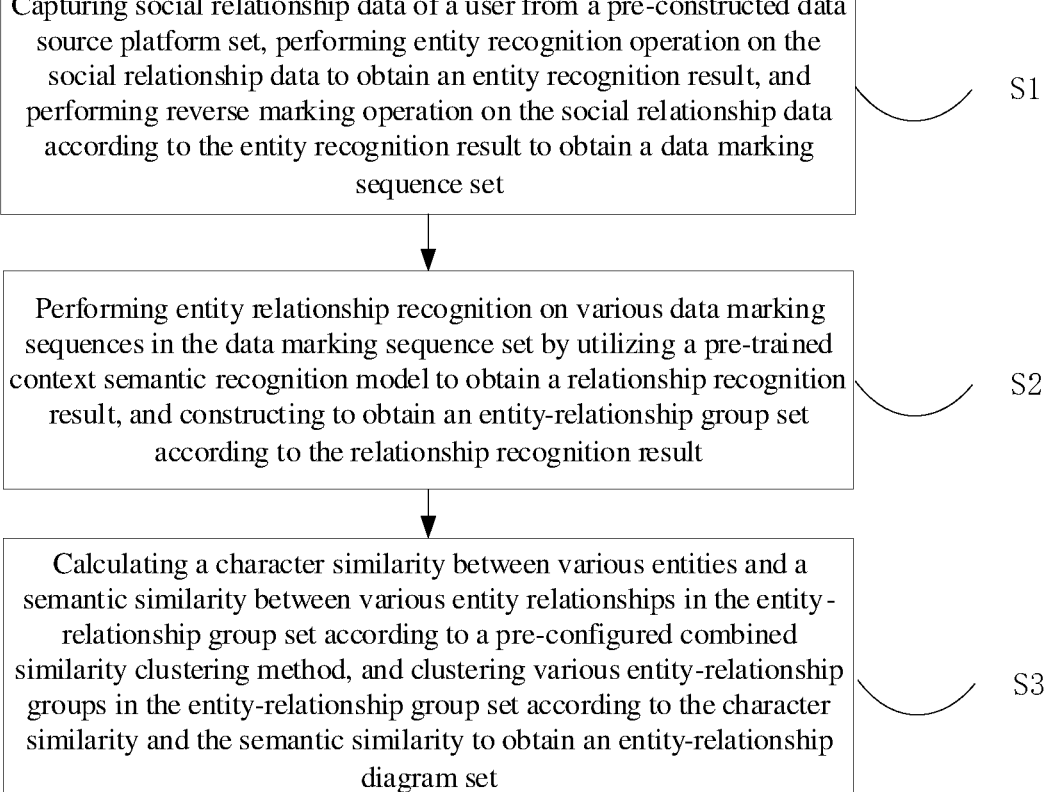

Capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set

S1

Performing entity relationship recognition on various data marking sequences in the data marking sequence set by utilizing a pre-trained context semantic recognition model to obtain a relationship recognition result, and constructing to obtain an entity-relationship group set according to the relationship recognition result

S2

Calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set

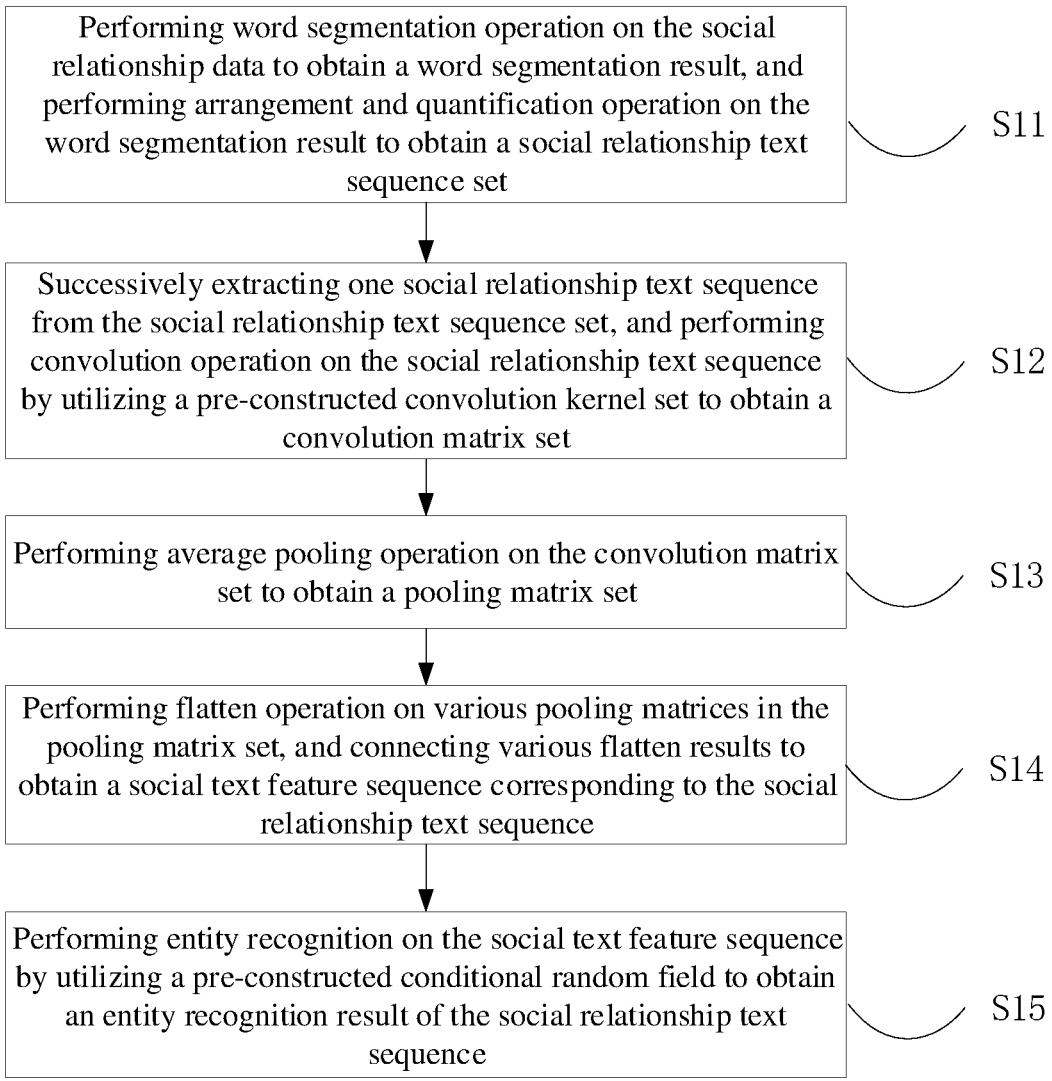

Performing word segmentation operation on the social relationship data to obtain a word segmentation result, and performing arrangement and quantification operation on the word segmentation result to obtain a social relationship text sequence set — S11

Successively extracting one social relationship text sequence from the social relationship text sequence set, and performing convolution operation on the social relationship text sequence by utilizing a pre-constructed convolution kernel set to obtain a convolution matrix set — S12

Performing average pooling operation on the convolution matrix set to obtain a pooling matrix set — S13

Performing flatten operation on various pooling matrices in the pooling matrix set, and connecting various flatten results to obtain a social text feature sequence corresponding to the social relationship text sequence — S14

Performing entity recognition on the social text feature sequence by utilizing a pre-constructed conditional random field to obtain an entity recognition result of the social relationship text sequence — S15

FIG. 2

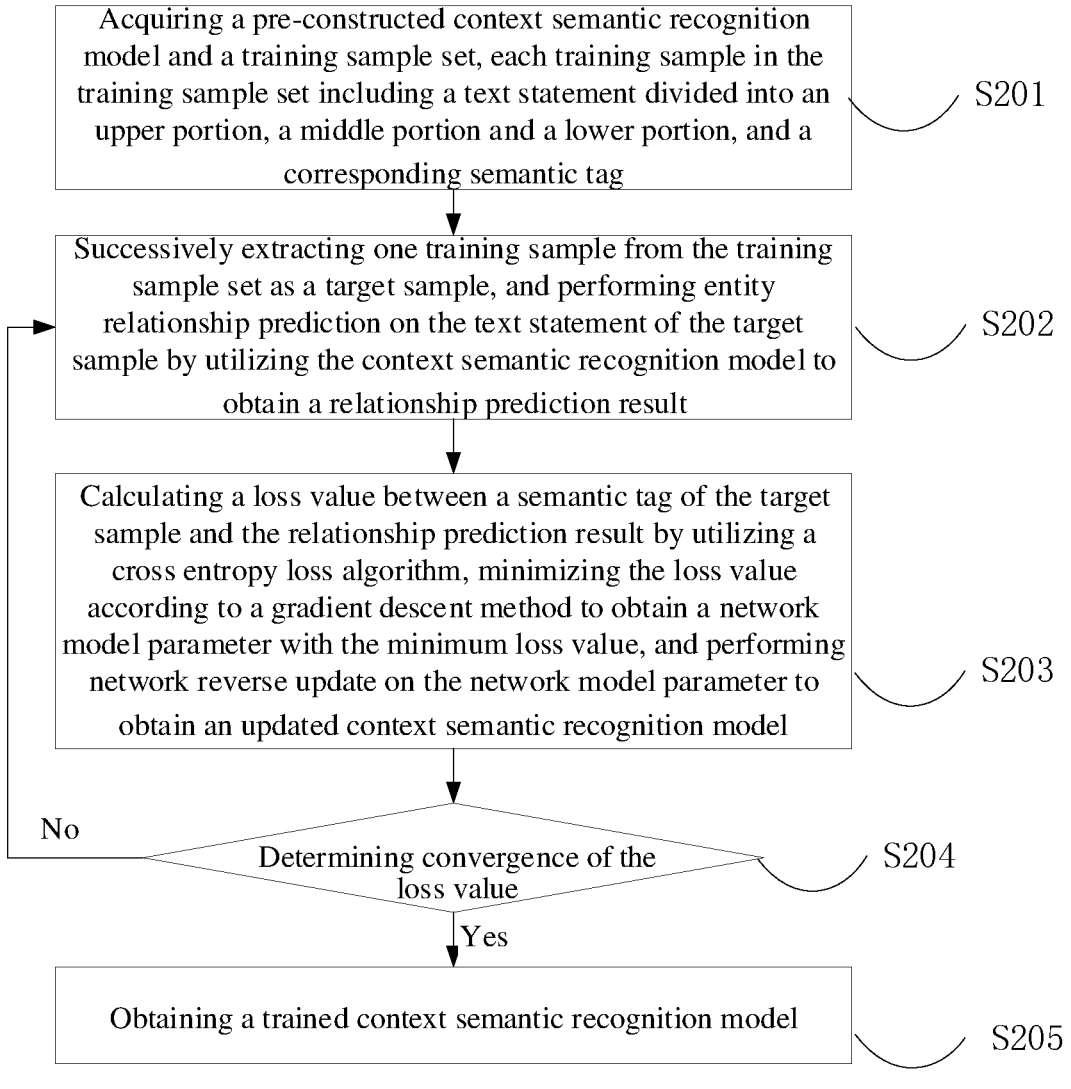

Acquiring a pre-constructed context semantic recognition model and a training sample set, each training sample in the training sample set including a text statement divided into an upper portion, a middle portion and a lower portion, and a corresponding semantic tag — S201

Successively extracting one training sample from the training sample set as a target sample, and performing entity relationship prediction on the text statement of the target sample by utilizing the context semantic recognition model to obtain a relationship prediction result — S202

Calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model — S203

No

Determining convergence of the loss value — S204

Yes

Obtaining a trained context semantic recognition model — S205

FIG. 4

METHOD, APPARATUS, DEVICE, AND STORAGE MEDIUM FOR CLUSTERING EXTRACTION OF ENTITY RELATIONSHIPS

CROSS REFERENCE TO RELATED APPLICATIONS

The present application claims the benefit of Chinese Patent Application No. 202310271936.7 filed on Mar. 16, 2023, the contents of which are incorporated herein by reference in their entirety.

TECHNICAL FIELD

The present disclosure relates to the technical field of artificial intelligence, and more particularly relates to a method, an apparatus, a device, and a storage medium for clustering extraction of entity relationships.

BACKGROUND

With the development of computer networks, there is increasingly abundant online data, and big data management is accepted by more and more enterprises. Nowadays, interpersonal networks become important channels for enterprises and individuals to acquire customers.

However, a construction process of the interpersonal networks needs the participation of an entity recognition process. Nowadays, for entity recognition, mostly analysis is performed through an entity recognition network, and it is relatively easy to acquire basic information such as personal attributes of a user. However, as information on the network is unstructured, the expression ways of various text contents related to the user are also different, which makes it difficult to acquire relatively high extraction efficiency of entities in the entity recognition process of information about behavioral habits such as interests and hobbies of the user today.

SUMMARY

The present disclosure provides a method, an apparatus, a device, and a storage medium for clustering extraction of entity relationships. A main object of the present disclosure is to improve the extraction efficiency of entity relationships.

In order to achieve the above object, the method for clustering extraction of entity relationships provided by the present disclosure includes:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

Optionally, clustering various entity-relationship groups in the entity-relationship group set according to the character similarity and the semantic similarity to obtain the entity-relationship diagram set includes:

configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and clustering various entity-relationship groups in the entity-relationship group set according to a nearest node algorithm and the mixed similarity to obtain the entity-relationship diagram set.

Optionally, performing entity relationship recognition on various data marking sequences in the data marking sequence set by utilizing a pre-trained context semantic recognition model to obtain a relationship recognition result includes:

marking tags of preceding text, middle text, and following text on the data marking sequence according to marks corresponding to two entity recognition results in the data marking sequence to obtain a full text marking sequence;

performing word segmentation quantization operation on the full text marking sequence by utilizing the pre-trained context semantic recognition model to obtain a preceding text quantization sequence, a middle text quantization sequence, and a following text quantization sequence;

performing intra-text and inter-text based self-attention configuration on the preceding text quantization sequence, the middle text quantization sequence, and the following text quantization sequence to obtain a text self-attention enhancement sequence; and performing feature extraction operation on the text self-attention enhancement sequence to obtain a feature sequence set, and performing full connection classification operation on the feature sequence set to obtain a relationship recognition result based on a semantic intention.

Optionally, prior to performing entity relationship recognition on various data marking sequences in the data marking sequence set by utilizing a pre-trained context semantic recognition model to obtain a relationship recognition result, the method further includes:

acquiring a pre-constructed context semantic recognition model and a training sample set, each training sample in the training sample set including a text statement divided into an upper portion, a middle portion and a lower portion, and a corresponding semantic tag;

successively extracting one training sample from the training sample set as a target sample, and performing entity relationship prediction on the text statement of the target sample by utilizing the context semantic recognition model to obtain a relationship prediction result;

calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model;

determining convergence of the loss value;

when the loss value does not converge, returning to the above step of successively extracting one training sample from the training sample set as a target sample, and iteratively updating the updated context semantic recognition model; and when the loss value converges, obtaining a trained context semantic recognition model.

Optionally, performing entity recognition operation on the social relationship data to obtain an entity recognition result includes:

performing word segmentation operation on the social relationship data to obtain a word segmentation result, and performing arrangement and quantification operation on the word segmentation result to obtain a social relationship text sequence set;

successively extracting one social relationship text sequence from the social relationship text sequence set, and performing convolution operation on the social relationship text sequence by utilizing a pre-constructed convolution kernel set to obtain a convolution matrix set;

performing average pooling operation on the convolution matrix set to obtain a pooling matrix set;

performing flatten operation on various pooling matrices in the pooling matrix set, and connecting various flatten results to obtain a social text feature sequence corresponding to the social relationship text sequence; and performing entity recognition on the social text feature sequence by utilizing a pre-constructed conditional random field to obtain an entity recognition result of the social relationship text sequence.

In order to solve the above problems, the present disclosure further provides an apparatus for clustering extraction of entity relationships, including:

a data pre-processing module configured for capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

an entity-relationship group construction module configured for performing entity relationship recognition on various data marking sequences in the data marking sequence set by utilizing a pre-trained context semantic recognition model to obtain a relationship recognition result, and constructing to obtain an entity-relationship group set according to the relationship recognition result; and an entity relationship clustering module configured for calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

Optionally, clustering various entity-relationship groups in the entity-relationship group set according to the character similarity and the semantic similarity to obtain the entity-relationship diagram set includes:

configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and clustering various entity-relationship groups in the entity-relationship group set according to a nearest node algorithm and the mixed similarity to obtain the entity-relationship diagram set.

Optionally, performing entity relationship recognition on various data marking sequences in the data marking sequence set by utilizing a pre-trained context semantic recognition model to obtain a relationship recognition result includes:

marking tags of preceding text, middle text, and following text on the data marking sequence according to marks corresponding to two entity recognition results in the data marking sequence to obtain a full text marking sequence;

performing word segmentation quantization operation on the full text marking sequence by utilizing the pre-trained context semantic recognition model to obtain a preceding text quantization sequence, a middle text quantization sequence, and a following text quantization sequence;

performing intra-text and inter-text based self-attention configuration on the preceding text quantization sequence, the middle text quantization sequence, and the following text quantization sequence to obtain a text self-attention enhancement sequence; and performing feature extraction operation on the text self-attention enhancement sequence to obtain a feature sequence set, and performing full connection classification operation on the feature sequence set to obtain a relationship recognition result based on a semantic intention.

In order to solve the above problems, the present disclosure further provides an electronic device, including:

at least one processor; and a memory in communication connection with the at least one processor; wherein the memory stores a computer program executable by the at least one processor, and the computer program is executed by the at least one processor to enable the at least one processor to execute the method for clustering extraction of entity relationships described above.

In order to solve the above problems, the present disclosure further provides a computer-readable storage medium, wherein at least one computer program is stored in the computer-readable storage medium, and the at least one computer program is executed by the processor in the electronic device to implement the method for clustering extraction of entity relationships described above.

According to an example of the present disclosure, an entity recognition result is obtained through entity recognition, and marking is performed according to the entity recognition result to obtain a data marking sequence set, wherein text is divided into preceding text, middle text, and following text by the data marking sequence due to the influence of entity marks; then semantic recognition is performed on the data marking sequence by a pre-trained context semantic recognition model to generate an entity-relationship group set, wherein "relationship" in the entity-relationship group is obtained from the preceding text, the middle text, and the following text on the whole, and thus is more accurate than that obtained by a method of taking "middle text" as "relationship"; and finally, entity relationships are clustered by a relationship similarity and a character similarity. Therefore, the method, the apparatus, the device, and the storage medium for clustering extraction of entity relationships provided by the example of the present disclosure may improve the extraction efficiency of entity relationships.

BRIEF DESCRIPTION OF THE ACCOMPANYING DRAWINGS

FIG. 1 is a schematic flow diagram of a method for clustering extraction of entity relationships provided by an example of the present disclosure;

FIG. 2 is a detailed schematic flow diagram of a step in the method for clustering extraction of entity relationships provided by an example of the present disclosure;

FIG. 4 is a detailed schematic flow diagram of a step in the method for clustering extraction of entity relationships provided by an example of the present disclosure;

Figure 3:
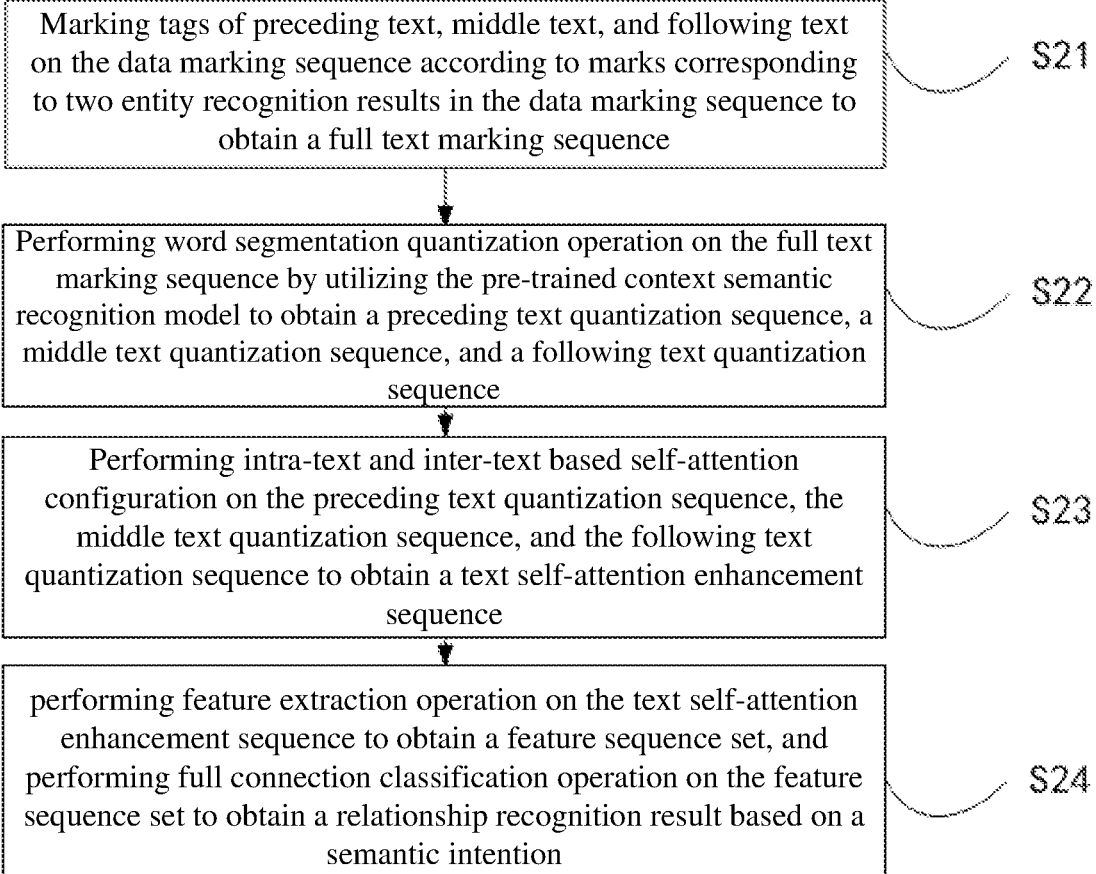
FIG. 3 is a detailed schematic flow diagram of a step in the method for clustering extraction of entity relationships provided by an example of the present disclosure.

The achievement of objects, functional features and advantages of the present disclosure will be further described with reference to the accompanying drawings in conjunction with examples.

DETAILED DESCRIPTION OF ILLUSTRATED EMBODIMENTS

It should be understood that the specific examples described herein are illustrative only and are not intended to limit the present disclosure.

An example of the present application provides a method for clustering extraction of entity relationships. In the example of the present application, execution subjects of the method for clustering extraction of entity relationships include, but are not limited to, at least one of electronic devices such as a server side and a terminal which may be configured to execute the method provided by the example of the present application. In other words, the method for clustering extraction of entity relationships may be executed by software or hardware installed on a terminal device or a service-side device, and the software may be a Blockchain platform. The server side includes, but is not limited to: a single server, a server cluster, a cloud server or a cloud server cluster, and the like. The server may be an independent server, and may also be a cloud server for providing basic cloud computing services, such as a cloud service, a cloud database, cloud computing, a cloud function, cloud storage, a network service, cloud communication, a middleware service, a domain name service, a security service, a Content Delivery Network (CDN), and a big data and artificial intelligence platform.

Referring to FIG. 1, FIG. 1 is a schematic flow diagram of a method for clustering extraction of entity relationships provided by an example of the present disclosure. In this example, the method for clustering extraction of entity relationships includes:

S1. capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set.

In an example of the present disclosure, the data source platform set includes both business platform type data of the user and personal social entertainment platform data. Specifically, according to the example of the present disclosure, the data source platform set is obtained by constructing a data anchor market including network platforms such as *chacha, *hu, *blog, *gle, and *juzi.

According to the example of the present disclosure, after social relationship data of a user is captured through the data source platform set, entity recognition is performed on the social relationship data, and tagging configuration is performed on recognized entities.

In detail, referring to FIG. 2, in an example of the present disclosure, performing entity recognition operation on the social relationship data to obtain an entity recognition result includes:

S11. performing word segmentation operation on the social relationship data to obtain a word segmentation result, and performing arrangement and quantification operation on the word segmentation result to obtain a social relationship text sequence set;

S12. successively extracting one social relationship text sequence from the social relationship text sequence set, and performing convolution operation on the social relationship text sequence by utilizing a pre-constructed convolution kernel set to obtain a convolution matrix set;

S13. performing average pooling operation on the convolution matrix set to obtain a pooling matrix set;

S14. performing flatten operation on various pooling matrices in the pooling matrix set, and connecting various flatten results to obtain a social text feature sequence corresponding to the social relationship text sequence; and S15. performing entity recognition on the social text feature sequence by utilizing a pre-constructed conditional random field to obtain an entity recognition result of the social relationship text sequence.

In an example of the present disclosure, word segmentation may be performed on the social relationship data by a word segmentation tool, such as jieba and a Chinese word segmentation system, and then quantization may be performed on a word segmentation result by a quantization tool, such as a one-hot encoder to obtain a social relationship text sequence set.

Further, according to an example of the present disclosure, convolution, pooling, and flatten feature extraction is performed on the social relationship text sequence set by a pre-constructed convolution kernel set, a pooling layer, a flatten layer, and the like, wherein different convolution kernels are used for extracting different features; and the pooling and flatten operation is used for performing dimension reduction on the extracted features to obtain a one-dimensional feature sequence, wherein the number of convolution kernels is the same as the number of one-dimensional feature sequences. Then, various one-dimensional feature sequences are connected again to obtain a social text feature sequence. Finally, according to the example of the present disclosure, entity recognition is performed on the social text feature sequence by a pre-constructed conditional random field to obtain an entity recognition result of the social relationship text sequence, wherein the conditional random field is an undirected graphical model of a random field, which may achieve a good effect in sequence labeling tasks such as word segmentation, part of speech labeling, and named entity recognition. A specific implementation process of the conditional random field in the model is not described in detail herein.

In an example of the present disclosure, after entity recognition results are obtained, reverse marking operation needs to be performed on various entity recognition results. The reverse marking operation refers to adding tags corresponding to the entity recognition results to corresponding positions of the social relationship data. For example, one piece of social relationship data is as follows: user A follows up main B, and then a tag is added to obtain: user A/ent-f/ follows up main B/ent-f/, wherein ent(entity) represents an entity tag, and f(figure) represents an entity type, wherein the entity type also has many unique tags, such as number n (num), article ar (article), and attribute at (attribute).

S2. Performing entity relationship recognition on various data marking sequences in the data marking sequence set by utilizing a pre-trained context semantic recognition model to obtain a relationship recognition result, and constructing to obtain an entity-relationship group set according to the relationship recognition result.

In an example of the present disclosure, the context semantic recognition model is a convolution neural network model including a bert attention network, a feature extraction network, and an intention classification full connection layer network, and is used for performing inter-segment and intra-segment attention configuration on a segmented sample to perform intention recognition.

In detail, referring to FIG. 3, in an example of the present disclosure, performing entity relationship recognition on various data marking sequences in the data marking sequence set by utilizing a pre-trained context semantic recognition model to obtain a relationship recognition result includes:

S21. marking tags of preceding text, middle text, and following text on the data marking sequence according to marks corresponding to two entity recognition results in the data marking sequence to obtain a full text marking sequence;

S22. performing word segmentation quantization operation on the full text marking sequence by utilizing the pre-trained context semantic recognition model to obtain a preceding text quantization sequence, a middle text quantization sequence, and a following text quantization sequence;

S23. performing intra-text and inter-text based self-attention configuration on the preceding text quantization sequence, the middle text quantization sequence, and the following text quantization sequence to obtain a text self-attention enhancement sequence; and S24. performing feature extraction operation on the text self-attention enhancement sequence to obtain a feature sequence set, and performing full connection classification operation on the feature sequence set to obtain a relationship recognition result based on a semantic intention.

It should be understood that text between entities is mostly a relatively short associated word, such as an action, "yes", and "having", and therefore, a situation of interpreting out of context is likely to occur when a relationship between the entities is recognized. Therefore, according to the example of the present disclosure, when the entity relationship is recognized, intention recognition is performed by means of a preceding text entity/a middle text entity/following text, and final intentions of the preceding text, the middle text and the following text are taken as the "middle text" to construct an entity-relationship group set, wherein a format of one entity-relationship group is as follows: original text entity 1-overall intention of preceding text, middle text, and following text-original text entity 2, wherein an attention weight configuration process is implemented by the bert attention network, and a detailed configuration process will not be described in detail herein.

Further, referring to FIG. 4, in an example of the present disclosure, prior to performing entity relationship recognition on various data marking sequences in the data marking sequence set by utilizing a pre-trained context semantic recognition model to obtain a relationship recognition result, the method further includes:

S201. acquiring a pre-constructed context semantic recognition model and a training sample set, each training sample in the training sample set including a text statement divided into an upper portion, a middle portion and a lower portion, and a corresponding semantic tag;

S202. successively extracting one training sample from the training sample set as a target sample, and performing entity relationship prediction on the text statement of the target sample by utilizing the context semantic recognition model to obtain a relationship prediction result;

S203. calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model;

S204. determining convergence of the loss value;

when the loss value does not converge, returning to the step S202 for iteratively updating the updated context semantic recognition model; and when the loss value converges, S205. obtaining a trained context semantic recognition model.

In the example of the present disclosure, the model is trained by ways of changing the format of samples input into the context semantic recognition model and increasing the inter-text self-attention recognition, the execution is monitored by the cross entropy loss algorithm and the gradient descent method in a training process, and finally the training degree of the model is determined by controlling the convergence of the loss value. When the loss value does not converge, it is indicated that there is significant progress in model training, and the training may also be continued, thereby returning to the step S202 for acquiring sample training; and when the loss value converges, it is proved that there is little change in a training effect of the model, and the training process may stop in time to avoid an over-fitting phenomenon, wherein the cross entropy loss algorithm is a method for measuring difference information between two probability distributions, and may be used for calculating a gap between the relationship prediction result (prediction result) and the semantic tag (real result); and the gradient descent method is a method for seeking the minimization of a target function, and seeks a suitable target value by iteratively adjusting parameters continuously by utilizing gradient information.

S3. Calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

In an example of the present disclosure, in the combined similarity clustering method, an edit distance algorithm in C# language, DSSN (Deep Structured Semantic Models), and a clustering algorithm (such as methods of KNN (K nearest node algorithm), and EM (maximum expectation algorithm)) may be adopted to obtain the entity-relationship diagram set. For example, according to the example of the present disclosure, the character similarity between entities in various entity-relationship groups may be calculated by an edit distance algorithm package in C# language, and the semantic similarity between entity relationships among the entities in various entity-relationship groups by DSSN (Deep Structured Semantic Models). Finally, the entity-relationship diagram set may be obtained by clustering algorithms such as KNN (K nearest node algorithm) and EM (maximum expectation algorithm), and other methods for clustering, wherein the clustering method of KNN adopted in the present disclosure is a simple machine learning method for classifying according to distance between different eigenvalues, with relatively low calculation complexity, thereby being suitable for processing massive and unstructured data in the present application.

Figure 5:
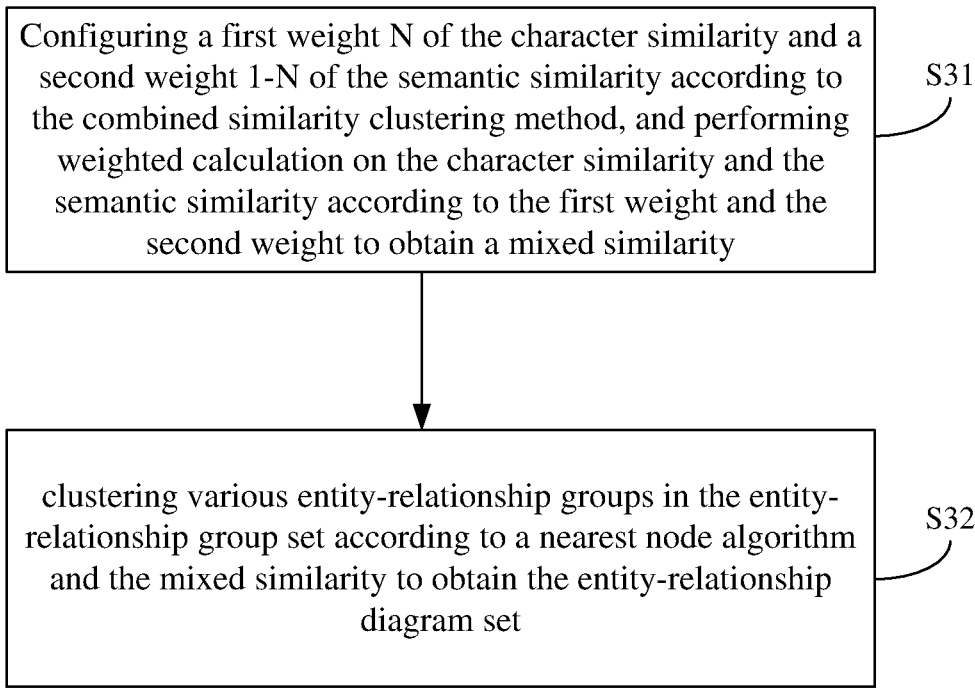
FIG. 5 is a detailed schematic flow diagram of a step in the method for clustering extraction of entity relationships provided by an example of the present disclosure.

In detail, referring to FIG. 5, in an example of the present disclosure, clustering various entity-relationship groups in the entity-relationship group set according to the character similarity and the semantic similarity to obtain the entity-relationship diagram set includes:

S31. configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and S32. clustering various entity-relationship groups in the entity-relationship group set according to a nearest node algorithm and the mixed similarity to obtain the entity-relationship diagram set;

wherein the N belongs to an interval of (0, 1).

In an example of the present disclosure, a calculation formula of the mixed similarity is as follows:

$$H_i = N * H_{1i} + (1 - N) * H_{2i}$$

where $H_i$ represents the mixed similarity between various entities in the $i^{th}$ entity-relationship group, $H_{1j}$ represents the character similarity between the entities in the $i^{th}$ entity-relationship group, and $H_{2j}$ represents the semantic similarity between the entity relationships among the entities in the $i^{th}$ entity-relationship group.

According to an example of the present disclosure, an entity recognition result is obtained through entity recognition, and marking is performed according to the entity recognition result to obtain a data marking sequence set, wherein text is divided into preceding text, middle text, and following text by the data marking sequence due to the influence of entity marks; then semantic recognition is performed on the data marking sequence by a pre-trained context semantic recognition model to generate an entity-relationship group set, wherein "relationship" in the entity-relationship group is obtained from the preceding text, the middle text, and the following text on the whole, and thus is more accurate than that obtained by a method of taking "middle text" as "relationship"; and finally, entity relationships are clustered by a relationship similarity and a character similarity. Therefore, the method for clustering extraction of entity relationships provided by the example of the present disclosure may improve the extraction efficiency of entity relationships.

Figure 6:
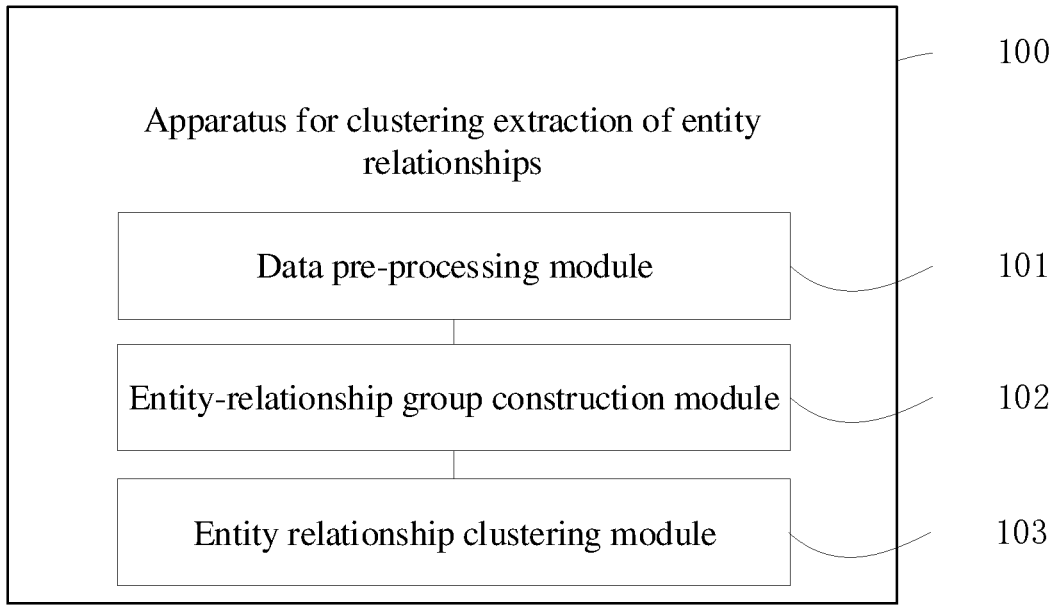
FIG. 6 is a functional block diagram of an apparatus for clustering extraction of entity relationships provided by an example of the present disclosure.

As shown in FIG. 6, FIG. 6 is a functional block diagram of an apparatus for clustering extraction of entity relationships provided by an example of the present disclosure.

The apparatus 100 for clustering extraction of entity relationships according to the present disclosure may be installed in an electronic device. According to the implemented functions, the apparatus 100 for clustering extraction of entity relationships may include a data pre-processing module 101, an entity-relationship group construction module 102, and an entity relationship clustering module 103. The module according to the present disclosure, which may also be referred to as a unit, refers to a series of computer program segments capable of being executed by a processor of the electronic device and capable of performing fixed functions, which are stored in a memory of the electronic device.

In this example, the functions of various modules/units are as follows:

the data pre-processing module 101 is configured for capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

the entity-relationship group construction module 102 is configured for performing entity relationship recognition on various data marking sequences in the data marking sequence set by utilizing a pre-trained context semantic recognition model to obtain a relationship recognition result, and constructing to obtain an entity-relationship group set according to the relationship recognition result; and the entity relationship clustering module 103 is configured for calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

In detail, in the example of the present application, the same technical means as the above method for clustering extraction of entity relationships described in FIG. 1 to FIG. 5 is adopted in the use of various modules in the apparatus 100 for clustering extraction of entity relationships, and the same technical effect may be produced, which will not be described in detail herein.

Figure 7:
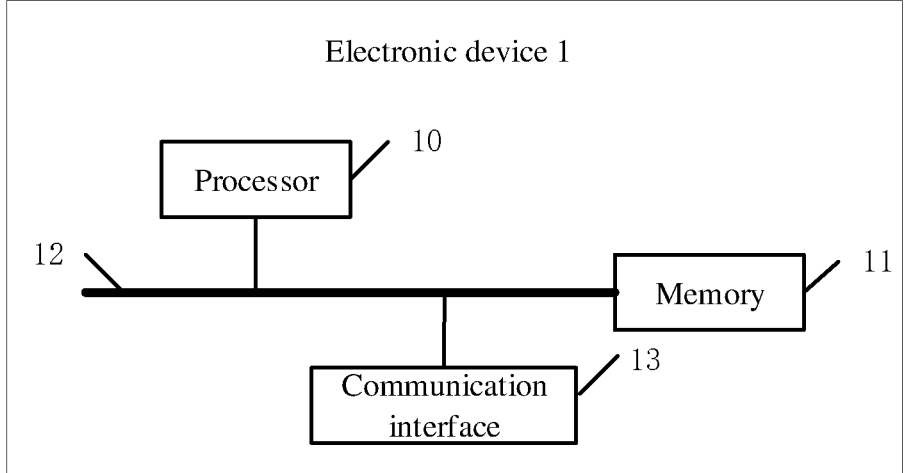
FIG. 7 is a schematic structural diagram of an electronic device for implementing the method for clustering extraction of entity relationships provided by an example of the present disclosure.

As shown in FIG. 7, FIG. 7 is a schematic structural diagram of an electronic device for implementing the method for clustering extraction of entity relationships provided by an example of the present disclosure.

The electronic device 1 may include a processor 10, a memory 11, a communication bus 12 and a communication interface 13, and may further include a computer program stored in the memory 11 and runnable on the processor 10, such as a clustering extraction program of entity relationships.

Wherein in some examples, the processor 10 may consist of an integrated circuit, such as a single packaged integrated circuit, or a plurality of packaged integrated circuits with same or different functions, and include one or more Central Processing Units (CPUs), a microprocessor, a digital processing chip, a graphics processor, a combination of various control chips, and the like. The processor 10 is a Control Unit of the electronic device 1, is connected to various components of the entire electronic device by utilizing various interfaces and lines, and executes various functions of the electronic device and processes data by running or executing programs or modules stored in the memory 11 (for example, executing a clustering extraction program of entity relationships, and the like), and calling data stored in the memory 11.

The memory 11 at least includes one type of readable storage medium, and the readable storage medium includes a flash memory, a mobile hard disk, a multi-media card, a card-type memory (such as an SD or DX memory), a magnetic memory, a magnetic disk, an optical disk, and the like. In some examples, the memory 11 may be an internal storage unit of the electronic device, such as the mobile hard disk of the electronic device. In other examples, the memory 11 may also be an external storage device of the electronic device, such as a plug-in type mobile hard disk, a Smart Media Card (SMC), a Secure Digital (SD) card, and a Flash Card equipped on the electronic device. Further, the memory 11 may further include both an internal storage unit and an external storage device of the electronic device. The memory 11 may be used not only for storing application software installed in the electronic device and various types of data, such as codes of a clustering extraction program of entity relationships, but also for temporarily storing data which has been output or is to be output.

The communication bus 12 may be a Peripheral Component Interconnect (PCI) bus or an Extended Industry Standard Architecture (EISA) bus, and the like. The buses may be divided into an address bus, a data bus, a control bus, and the like. The bus is arranged to achieve connection communication between the memory 11 and at least one processor 10, and the like.

The communication interface 13 is used for communication between the above electronic device 1 and other devices, including a network interface and a user interface. Optionally, the network interface may include a wired interface and/or a wireless interface (such as a WI-FI interface, and a Bluetooth interface), typically for establishing communication connection between the electronic device and other electronic devices. The user interface may be a Display, an input unit (such as a Keyboard), and optionally the user interface may also be a standard wired interface or wireless interface. Optionally, in some examples, the display may be an LED display, a liquid crystal display, a touch-sensitive liquid crystal display, an Organic Light-Emitting Diode (OLED) touchpad, and the like. Wherein the display may also be appropriately referred to as a display screen or a display unit for displaying information processed in the electronic device and for displaying a visualized user interface.

FIG. 7 only shows the electronic device with components, and it would be understood by those skilled in the art that the structure shown in FIG. 7 does not constitute a limitation of the electronic device 1, and the electronic device 1 may include fewer or more components than shown, a combination of some components, or a different arrangement of components.

For example, although not shown, the electronic device 1 may further include a power supply (such as a battery) for supplying power to various components, and preferably the power supply may be logically connected to the at least one processor 10 through a power management apparatus, so that functions such as charging management, discharging management, and power consumption management are achieved through the power management apparatus. The power supply may further include one or more direct-current or alternating-current power supplies, recharging apparatus, power failure detection circuits, power converters or inverters, power status indicators, and any other components. The electronic device 1 may further include various sensors, Bluetooth modules, Wi-Fi modules, and the like, which will not be described in detail herein.

It should be understood that the examples are for illustrative purposes only, and the structures are not to be construed as limiting the scope of the patent application.

The clustering extraction program of entity relationships stored in the memory 11 in the electronic device 1 is a combination of a plurality of instructions, and when running in the processor 10, the clustering extraction program may implement:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

Specifically, reference may be made to the description of relevant steps in the examples corresponding to the accompanying drawings for a method for specific implementation of the above instructions by the processor 10, which will not be described in detail herein.

Further, the integrated modules/units of the electronic device 1, if implemented in the form of software functional units and sold or used as independent products, may be stored in a computer-readable storage medium. The computer-readable storage medium may be volatile or nonvolatile. For example, the computer-readable medium may include: any entity or apparatus, recording medium, U disk, mobile hard disk, magnetic disk, optical disk, computer memory, and Read-Only Memory (ROM) capable of carrying the computer program code.

The present disclosure further provides a computer-readable storage medium storing a computer program, and when executed by a processor of an electronic device, the computer program may implement:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set.

In several examples provided by the present disclosure, it should be understood that the disclosed device, apparatus, and method may be implemented in other ways. For example, the device examples described above are merely illustrative, for example, the partitioning of the modules is merely a logical function partitioning, and other partitioning ways may be used in actual implementation.

The modules illustrated as separate components may be or may not be physically separated, and the components shown as modules may be or may not be physical units, namely the components may be located in one place, or may also be distributed on a plurality of network elements. Some or all of the modules may be selected to achieve the object of the solution of the example according to actual needs.

In addition, various functional modules in various examples of the present disclosure may be integrated in one processing unit, may also be physically present in various units separately, and two or more units may also be integrated in one unit. The above integrated units may be implemented in the form of hardware or in the form of hardware and software functional modules.

It will be evident to those skilled in the art that the present disclosure is not limited to the details of the foregoing illustrative examples, and the present disclosure may be implemented in other specific forms without departing from the spirit or essential characteristics of the present disclosure.

Therefore, the examples are to be considered as illustrative in all respects and not restrictive, the scope of the present disclosure is defined by the appended claims rather than by the foregoing description, and all changes which are intended to fall within the meaning and scope of equivalency of the claims are therefore to be included in the present disclosure. Any reference numerals of association diagrams in the claims shall not be construed as limiting the claims concerned.

A Blockchain referred to in the present disclosure is a new application mode of computer technologies, such as distributed data storage, point-to-point transmission, consensus mechanism, and an encryption algorithm. The Blockchain, essentially a decentralized database, is a string of data blocks generated in association by utilizing a cryptographic method, each data block contains information about a batch of network transactions for verifying the validity of the information (anti-counterfeiting) and generating the next block. The Blockchain may include a Blockchain underlying platform, a platform product service layer, an application service layer, and the like.

According to the example of the present application, relevant data may be acquired and processed based on an artificial intelligence technology, wherein Artificial Intelligence (AI) is a theory, a method, a technology, and an application system for simulating, extending and expanding human intelligence, perceiving the environment, acquiring knowledge and using the knowledge for obtaining the best results by utilizing a digital computer or digital computer-controlled machine.

In addition, obviously the word "including" does not exclude other units or steps, and the singular does not exclude the plural. A plurality of units or apparatus recited in the system claims may also be implemented by one unit or apparatus through software or hardware. The terms such as first and second are used for referring to names and do not denote any particular order.

Finally, it should be noted that the above examples are used for illustrating rather than limiting the technical solution of the present disclosure. Although the present disclosure is described in detail with reference to the preferred examples, those ordinarily skilled in the art would appreciate that modifications and substitutions may be made to the technical solution of the present disclosure without departing from the spirit and scope of the technical solution of the present disclosure.

What is claimed is:

1. A method for clustering extraction of entity relationships from unstructured social network text data, the method being configured to improve accuracy of relationship extraction by mitigating misinterpretation caused by short associated words between entities, the method comprising:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set;

wherein performing entity relationship recognition on various data marking sequences in the data marking sequence set by utilizing a pre-trained context semantic recognition model to obtain a relationship recognition result comprises:

marking tags of preceding text, middle text, and following text on the data marking sequence according to marks corresponding to two entity recognition results in the data marking sequence to obtain a full text marking sequence;

performing word segmentation quantization operation on the full text marking sequence by utilizing the pre-trained context semantic recognition model to obtain a preceding text quantization sequence, a middle text quantization sequence, and a following text quantization sequence;

performing intra-text and inter-text based self-attention configuration on the preceding text quantization sequence, the middle text quantization sequence, and the following text quantization sequence to obtain a text self-attention enhancement sequence; and performing feature extraction operation on the text self-attention enhancement sequence to obtain a feature sequence set, and performing full connection classification operation on the feature sequence set to obtain a relationship recognition result based on a semantic intention;

wherein prior to performing entity relationship recognition on various data marking sequences in the data marking sequence set by utilizing a pre-trained context semantic recognition model to obtain a relationship recognition result, the method further comprises:

acquiring a pre-constructed context semantic recognition model and a training sample set, each training sample in the training sample set comprising a text statement divided into an upper portion, a middle portion and a lower portion, and a corresponding semantic tag;

successively extracting one training sample from the training sample set as a target sample, and performing entity relationship prediction on the text statement of the target sample by utilizing the context semantic recognition model to obtain a relationship prediction result;

calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model;

determining convergence of the loss value;

when the loss value does not converge, returning to the above step of successively extracting one training sample from the training sample set as a target sample, and iteratively updating the updated context semantic recognition model; and when the loss value converges, obtaining a trained context semantic recognition model.

2. The method for clustering extraction of entity relationships of claim 1, wherein the combined similarity clustering method comprises:

calculating the character similarity between the entities in various entity-relationship groups by an edit distance algorithm package in C# language;

calculating the semantic similarity between the entity relationships among the entities in various entity-relationship groups by a Deep Structured Semantic Model (DSSN) model; and clustering various entity-relationship groups in the entity-relationship group set by a K nearest node (KNN) clustering algorithm and according to the character similarity and the semantic similarity to obtain the entity-relationship diagram set.

3. The method for clustering extraction of entity relationships of claim 1, wherein clustering various entity-relationship groups in the entity-relationship group set according to the character similarity and the semantic similarity to obtain the entity-relationship diagram set comprises:

configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and clustering various entity-relationship groups in the entity-relationship group set according to a nearest node algorithm and the mixed similarity to obtain the entity-relationship diagram set;

the N belonging to an interval of (0, 1).

4. The method for clustering extraction of entity relationships of claim 3, wherein a calculation formula of the mixed similarity is as follows:

$$H_i = N * H_{1i} + (1 - N) * H_{2i}$$

where $H_i$ represents the mixed similarity between various entities in the $i^{th}$ entity-relationship group, $H_{1i}$ represents the character similarity between the entities in the $i^{th}$ entity-relationship group, and $H_{2i}$ represents the semantic similarity between the entity relationships among the entities in the $i^{th}$ entity-relationship group.

5. The method for clustering extraction of entity relationships of claim 1, wherein the performing entity recognition operation on the social relationship data to obtain an entity recognition result comprises:

performing word segmentation operation on the social relationship data to obtain a word segmentation result, and performing arrangement and quantification operation on the word segmentation result to obtain a social relationship text sequence set;

successively extracting one social relationship text sequence from the social relationship text sequence set, and performing convolution operation on the social relationship text sequence by utilizing a pre-constructed convolution kernel set to obtain a convolution matrix set;

performing average pooling operation on the convolution matrix set to obtain a pooling matrix set;

performing flatten operation on various pooling matrices in the pooling matrix set, and connecting various flatten results to obtain a social text feature sequence corresponding to the social relationship text sequence; and performing entity recognition on the social text feature sequence by utilizing a pre-constructed conditional random field to obtain an entity recognition result of the social relationship text sequence.

6. An electronic device for clustering extraction of entity relationships from unstructured social network text data, the method being configured to improve accuracy of relationship extraction by mitigating misinterpretation caused by short associated words between entities, the electronic device comprising:

at least one processor; and a memory in communication connection with the at least one processor; wherein the memory stores a computer program executable by the at least one processor, and the computer program is executed by the at least one processor to enable the at least one processor to execute the steps of:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set;

wherein performing entity relationship recognition on various data marking sequences in the data marking sequence set by utilizing a pre-trained context semantic recognition model to obtain a relationship recognition result comprises:

marking tags of preceding text, middle text, and following text on the data marking sequence according to marks corresponding to two entity recognition results in the data marking sequence to obtain a full text marking sequence;

performing word segmentation quantization operation on the full text marking sequence by utilizing the pre-trained context semantic recognition model to obtain a preceding text quantization sequence, a middle text quantization sequence, and a following text quantization sequence;

performing intra-text and inter-text based self-attention configuration on the preceding text quantization sequence, the middle text quantization sequence, and the following text quantization sequence to obtain a text self-attention enhancement sequence; and performing feature extraction operation on the text self-attention enhancement sequence to obtain a feature sequence set, and performing full connection classification operation on the feature sequence set to obtain a relationship recognition result based on a semantic intention;

wherein prior to performing entity relationship recognition on various data marking sequences in the data marking sequence set by utilizing a pre-trained context semantic recognition model to obtain a relationship recognition result, the method further comprises:

acquiring a pre-constructed context semantic recognition model and a training sample set, each training sample in the training sample set comprising a text statement divided into an upper portion, a middle portion and a lower portion, and a corresponding semantic tag;

successively extracting one training sample from the training sample set as a target sample, and performing entity relationship prediction on the text statement of the target sample by utilizing the context semantic recognition model to obtain a relationship prediction result;

calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model;

determining convergence of the loss value;

when the loss value does not converge, returning to the above step of successively extracting one training sample from the training sample set as a target sample, and iteratively updating the updated context semantic recognition model; and when the loss value converges, obtaining a trained context semantic recognition model.

7. The electronic device of claim 6, wherein the combined similarity clustering method comprises:

calculating the character similarity between the entities in various entity-relationship groups by an edit distance algorithm package in C# language;

calculating the semantic similarity between the entity relationships among the entities in various entity-relationship groups by a Deep Structured Semantic Model (DSSN) model; and clustering various entity-relationship groups in the entity-relationship group set by a K nearest node (KNN) clustering algorithm and according to the character similarity and the semantic similarity to obtain the entity-relationship diagram set.

8. The electronic device of claim 6, wherein the clustering various entity-relationship groups in the entity-relationship group set according to the character similarity and the semantic similarity to obtain the entity-relationship diagram set comprises:

configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and clustering various entity-relationship groups in the entity-relationship group set according to a nearest node algorithm and the mixed similarity to obtain the entity-relationship diagram set;

the N belonging to an interval of (0, 1).

9. The electronic device of claim 8, wherein a calculation formula of the mixed similarity is as follows:

$$H_i = N * H_{1i} + (1 - N) * H_{2i}$$

where $H_i$ represents the mixed similarity between various entities in the $i^{th}$ entity-relationship group, $H_{1i}$ represents the character similarity between the entities in the $i^{th}$ entity-relationship group, and $H_{2i}$ represents the semantic similarity between the entity relationships among the entities in the $i^{th}$ entity-relationship group.

10. The electronic device of claim 6, wherein the performing entity recognition operation on the social relationship data to obtain an entity recognition result comprises:

performing word segmentation operation on the social relationship data to obtain a word segmentation result, and performing arrangement and quantification operation on the word segmentation result to obtain a social relationship text sequence set;

successively extracting one social relationship text sequence from the social relationship text sequence set, and performing convolution operation on the social relationship text sequence by utilizing a pre-constructed convolution kernel set to obtain a convolution matrix set;

performing average pooling operation on the convolution matrix set to obtain a pooling matrix set;

performing flatten operation on various pooling matrices in the pooling matrix set, and connecting various flatten results to obtain a social text feature sequence corresponding to the social relationship text sequence; and performing entity recognition on the social text feature sequence by utilizing a pre-constructed conditional random field to obtain an entity recognition result of the social relationship text sequence.

11. A non-transitory computer-readable storage medium storing a computer program for clustering extraction of entity relationships from unstructured social network text data, the method being configured to improve accuracy of relationship extraction by mitigating misinterpretation caused by short associated words between entities, the computer program, when executed by a processor, implementing the steps of:

capturing social relationship data of a user from a pre-constructed data source platform set, performing entity recognition operation on the social relationship data to obtain an entity recognition result, and performing reverse marking operation on the social relationship data according to the entity recognition result to obtain a data marking sequence set;

performing entity relationship recognition on various data marking sequences in the data marking sequence set by utilizing a pre-trained context semantic recognition model to obtain a relationship recognition result, and constructing to obtain an entity-relationship group set according to the relationship recognition result; and calculating a character similarity between various entities and a semantic similarity between various entity relationships in the entity-relationship group set according to a pre-configured combined similarity clustering method, and clustering various entity-relationship groups in the entity-relationship group set according to the character similarity and the semantic similarity to obtain an entity-relationship diagram set;

wherein performing entity relationship recognition on various data marking sequences in the data marking sequence set by utilizing a pre-trained context semantic recognition model to obtain a relationship recognition result comprises:

marking tags of preceding text, middle text, and following text on the data marking sequence according to marks corresponding to two entity recognition results in the data marking sequence to obtain a full text marking sequence;

performing word segmentation quantization operation on the full text marking sequence by utilizing the pre-trained context semantic recognition model to obtain a preceding text quantization sequence, a middle text quantization sequence, and a following text quantization sequence;

performing intra-text and inter-text based self-attention configuration on the preceding text quantization sequence, the middle text quantization sequence, and the following text quantization sequence to obtain a text self-attention enhancement sequence; and performing feature extraction operation on the text self-attention enhancement sequence to obtain a feature sequence set, and performing full connection classification operation on the feature sequence set to obtain a relationship recognition result based on a semantic intention;

wherein prior to performing entity relationship recognition on various data marking sequences in the data marking sequence set by utilizing a pre-trained context semantic recognition model to obtain a relationship recognition result, the method further comprises:

acquiring a pre-constructed context semantic recognition model and a training sample set, each training sample in the training sample set comprising a text statement divided into an upper portion, a middle portion and a lower portion, and a corresponding semantic tag;

successively extracting one training sample from the training sample set as a target sample, and performing entity relationship prediction on the text statement of the target sample by utilizing the context semantic recognition model to obtain a relationship prediction result;

calculating a loss value between a semantic tag of the target sample and the relationship prediction result by utilizing a cross entropy loss algorithm, minimizing the loss value according to a gradient descent method to obtain a network model parameter with the minimum loss value, and performing network reverse update on the network model parameter to obtain an updated context semantic recognition model;

determining convergence of the loss value;

when the loss value does not converge, returning to the above step of successively extracting one training sample from the training sample set as a target sample, and iteratively updating the updated context semantic recognition model; and when the loss value converges, obtaining a trained context semantic recognition model.

12. The non-transitory computer-readable storage medium of claim 11, wherein the clustering various entity-relationship groups in the entity-relationship group set according to the character similarity and the semantic similarity to obtain an entity-relationship diagram set comprises:

configuring a first weight N of the character similarity and a second weight 1-N of the semantic similarity according to the combined similarity clustering method, and performing weighted calculation on the character similarity and the semantic similarity according to the first weight and the second weight to obtain a mixed similarity; and clustering various entity-relationship groups in the entity-relationship group set according to a nearest node algorithm and the mixed similarity to obtain the entity-relationship diagram set;

the N belonging to an interval of (0, 1).

13. The non-transitory computer-readable storage medium of claim 12, wherein a calculation formula of the mixed similarity is as follows:

$$H_i = N * H_{1i} + (1 - N) * H_{2i}$$

where $H_i$ represents the mixed similarity between various entities in the $i^{th}$ entity-relationship group, $H_{1i}$ represents the character similarity between the entities in the $i^{th}$ entity-relationship group, and $H_{2i}$ represents the semantic similarity between the entity relationships among the entities in the $i^{th}$ entity-relationship group.

14. The non-transitory computer-readable storage medium of claim 11, wherein the performing entity recognition operation on the social relationship data to obtain an entity recognition result comprises:

performing word segmentation operation on the social relationship data to obtain a word segmentation result, and performing arrangement and quantification operation on the word segmentation result to obtain a social relationship text sequence set;

successively extracting one social relationship text sequence from the social relationship text sequence set, and performing convolution operation on the social relationship text sequence by utilizing a pre-constructed convolution kernel set to obtain a convolution matrix set;

performing average pooling operation on the convolution matrix set to obtain a pooling matrix set;

performing flatten operation on various pooling matrices in the pooling matrix set, and connecting various flatten results to obtain a social text feature sequence corresponding to the social relationship text sequence; and performing entity recognition on the social text feature sequence by utilizing a pre-constructed conditional random field to obtain an entity recognition result of the social relationship text sequence.

* * * * *